United States Patent [19]

Ohta et al.

[11] 4,292,887
[45] Oct. 6, 1981

[54] POWER SERVO BOOSTER

[75] Inventors: Ryuji Ohta, Higashimatsuyama; Yoshimichi Inoue, Kawashima, both of Japan

[73] Assignee: Jidosha Kiki Co., Ltd., Tokyo, Japan

[21] Appl. No.: 954,952

[22] Filed: Oct. 26, 1978

[30] Foreign Application Priority Data

Nov. 8, 1977 [JP] Japan ............... 52-149809[U]

[51] Int. Cl.³ ............................................. F01B 19/00
[52] U.S. Cl. ..................................... 92/94; 92/89 D; 92/99
[58] Field of Search ............... 92/98 D, 99, 94, 78, 92/79; 91/369 R, 369 A, 369 B

[56] References Cited

U.S. PATENT DOCUMENTS

| 2,258,009 | 10/1941 | Horton | 92/78 |
|---|---|---|---|
| 2,972,983 | 2/1961 | Ayers, Jr. | 91/369 B |
| 3,017,866 | 1/1962 | Stelzer | 92/99 |
| 3,090,402 | 5/1963 | St. Clair | 92/99 |
| 3,289,547 | 12/1966 | Kytta | 92/99 |
| 3,312,147 | 4/1967 | Reichard | 92/99 |
| 3,756,124 | 9/1973 | Camm | 91/369 B |
| 3,981,227 | 9/1976 | Azuma | 92/99 |

FOREIGN PATENT DOCUMENTS

| 1954625 | 5/1971 | Fed. Rep. of Germany | 91/369 R |
| 52-66698 | 3/1977 | Japan . | |
| 1363242 | 8/1974 | United Kingdom | 91/369 B |

Primary Examiner—Abraham Hershkovitz
Attorney, Agent, or Firm—Sughrue, Mion, Zinn, Macpeak & Seas

[57] ABSTRACT

A power servo of the fluid differential type having a power piston and a diaphragm defining two cavities maintained at a differential pressure. An air passage is formed to release any air present in a space between the diaphragm and the disc portion of the power piston. The air passage may be formed as a split groove in the flange or as a hole through it. The groove may be either circumferential or axial to allow air to escape into the atmospheric chamber of the power servo.

9 Claims, 11 Drawing Figures

POWER SERVO BOOSTER

BACKGROUND OF THE INVENTION

This invention relates to a power servo of the fluid differential pressure actuated type, and more particularly to a device for escaping air confined in a space defined between a diaphragm and a power piston to promote return speed of the piston during the non-servo period. The specific structural implementation, embodying the invention aids in minimizing working period for discharging air in brake circuit.

A conventional power servo booster is shown in FIG. 1, wherein a power piston is connected to a control rod 8 in turn coupled to a vehicle operator controlled brake pedal (not shown). The power piston 1 comprises a disc portion 1a, a flange portion 1c, an annular groove 1b formed between the disc 1a and the flange 1c, and a sleeve portion 1d extending from the peripheral end of the disc portion 1a.

A diaphragm 2 is secured to the piston 1 and a housing consisting of front and rear shells 3 and 4, and cooperates with the piston and the housing to divide the housing into differential pressure chambers, namely an atmospheric chamber 5 and a negative chamber 6. The inner peripheral end of the diaphragm is secured to the annular groove 1b and the outer peripheral end thereof is secured to the front and rear shells. A radially outward extending section 2a of the diaphragm 2 is in surface engagement with the disc portion 1a of the piston 1, and a folded back portion 2b of the diaphragm 2 is in surface engagement of the sleeve 1d under pressure. Reference numeral 7 designates a negative pressure passage connected to an intake manifold to provide negative pressure in the chamber 6. Servos of this type are shown in U.S. Pat. Nos. 3,136,229 and 3,183,789.

With this Prior Art structure, during normal operation, in which negative pressure is introduced in the chamber 6 gas communication between the negative chamber 6 and the atmospheric chamber 5 is blocked by conventional valve means (not shown). When the control rod 8 is pushed towards the left, simultaneously, air is introduced in the atmospheric chamber 5 to provide a pressure differential therebetween to thereby provide urging force of the power piston 1. A push rod 9 connected to a master cylinder (not shown) is moved requiring only a small pressing force of a brake-foot pedal.

Upon releasing the control rod 8, the atmospheric chamber 5 communicates with the negative chamber 6 to provide equal pressure therein, so that the power piston 1 together with the diaphragm 2 are restored to their original position by a biasing force of a spring 10.

Generally, the radially outward extending section 2a and the fold back portion 2b of the diaphragm 2 are in surface engagement with the disc portion 1a and the sleeve portion 1d of the power piston 1, respectively, during the above described power-servo operation. However, when negative pressure is not introduced from the passage 7, such as during air discharging work in the brake piping at the time of the safety checkup of the product, or during assembly, the radially outward extending section 2a may be spaced apart from the disc 1a urging the control rod 8 inward due to no pressure differential between the chambers 5 and 6. The surface engagement between the sleeve 1d and the folded back portion 2b is released.

Therefore air may accumulate in a space defined between the extending section 2a and the disc 1a as shown in FIG. 2 during the return stroke of the power piston. The air accumulated in the space prevents the piston from moving rearwardly, so that return speed of the piston is seriously decreased. That is, since it is necessary to compress the confined air, to return the piston and the force for compressing the confined air opposes the rearward movement of the piston, due to Boyle's law. This trapped air then inpedes operation of the servo.

In the prior art a recognition of this problem exists as shown in Japanese Utility Model No. 1166698 dated Mar. 31, 1977. Specifically, this prior shows in FIG. 2 that under some conditions, for example when the piston is rest after non-powered operation, an air chamber may be created between the disc and the diaphragm. The prior art overcomes the problem by placement of a port [18 in FIG. 1 of the Utility Model] so that opposite surfaces of the disc communicate with the constant pressure chamber (negative side). The Utility Model specifically introduces pressure from the constant pressure chamber through a port formed in the piston to separate the piston and the diaphragm except for a small portion of the diaphragm located near the inner periphery. This reduces the effective diameter of the diaphragm during compression to reduce pedaling force. As a result, during non-powered operation of the brake booster, the pressure differential produced between the constant pressure section and the variable pressure section is reduced to make the loss of brake pedaling pressure very small.

During reset, when the constant pressure chamber is held at a reduced pressure, the port in the piston allows air to be removed from the space between the piston and the diaphragm thereby eliminating any air pocket that may tend to form. The Utility Model also discloses the use of axial slots formed in either the disc or the diaphragm is communication with the constant pressure chamber to expel any air that may be trapped during reseting of the servo device.

The system disclosed in the prior art Utility Model, while effective to eliminate air pockets introduces other problems into the system. By having ports disposed in the flange that element is structurally weakened. Also, the port must be of sufficient size to ensure that no local or small air pockets will be formed. This in turn causes a portion of the flange to be a discontenuous surface tending to deform the diaphragm. In extreme cases where the diaphragm may be weakened it may be extruded, in port, through such ports as a result of the pressure differential across the diaphragm. This may lead to eventual failure of the diaphragm with serious results.

SUMMARY OF THE INVENTION

It is an object of this invention to define a power servo eliminating air pockets that may exist during resetting of the system following non-powered operation.

It is also another object of this invention to overcome the above-mentioned drawbacks and to provide an improved power servo booster.

It is another object of this invention to define a power servo booster that is reliable and offers improved performance.

Briefly, and in accordance with this invention, an air passage is formed to release air confined in the space between the diaphragm and the disc portion of the power piston into the atmospheric chamber during non-servo period of the power piston so as to smoothly return the piston. The air passage does not interfere with normal operation but provide a bleed passage to remove any air that accummulates.

DETAILED DESCRIPTION OF THE PREFERRED EMBODIMENTS

Figure 1:
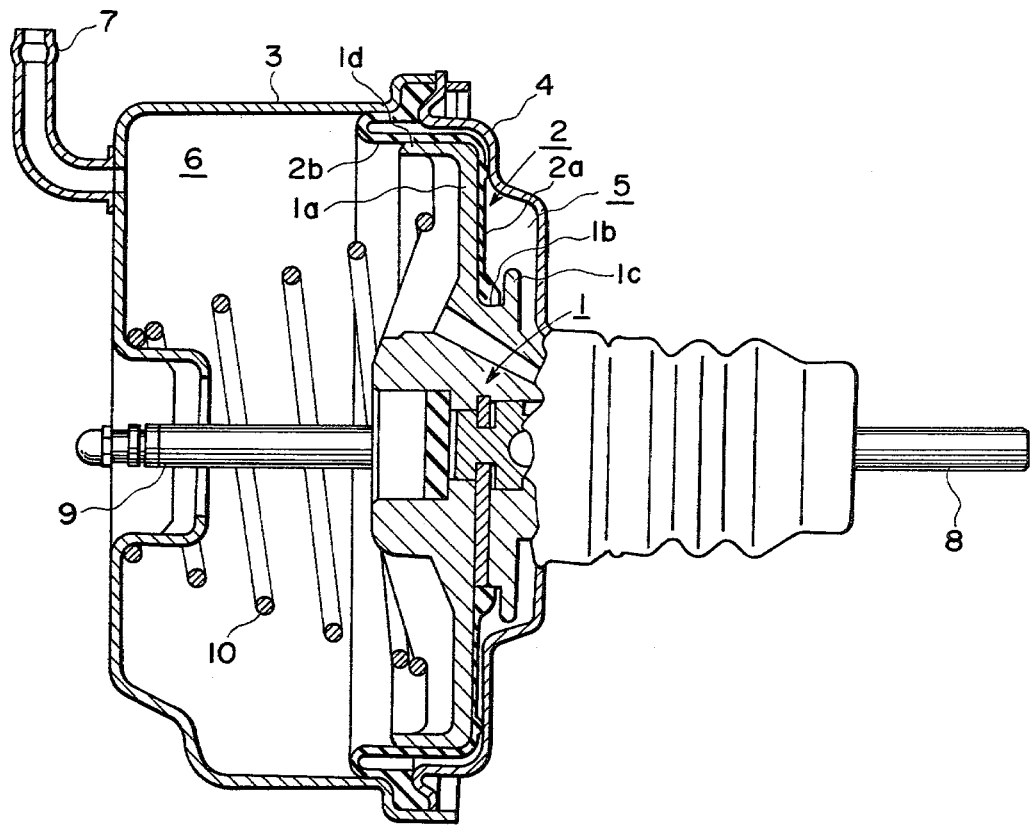
FIG. 1 shows a partial cross-sectional view of a prior art type power servo booster.
Figure 3:
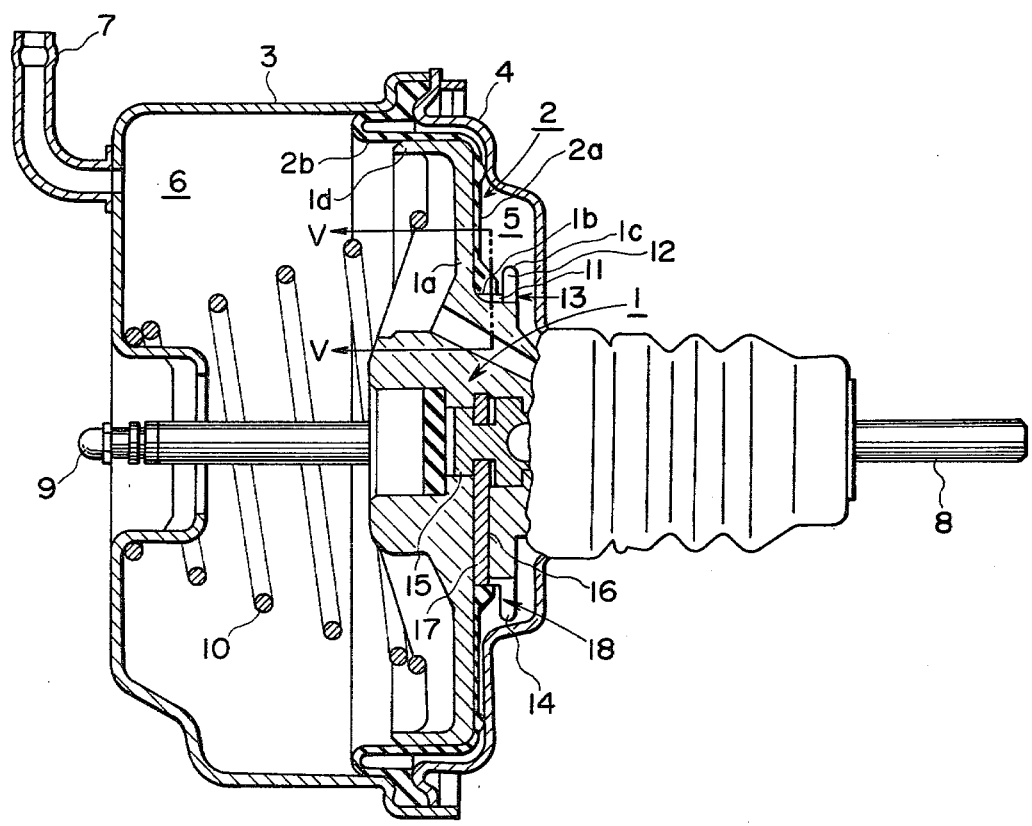
FIG. 3 shows a partial cross-sectional view of a power servo booster according to the present invention.
Figure 4:
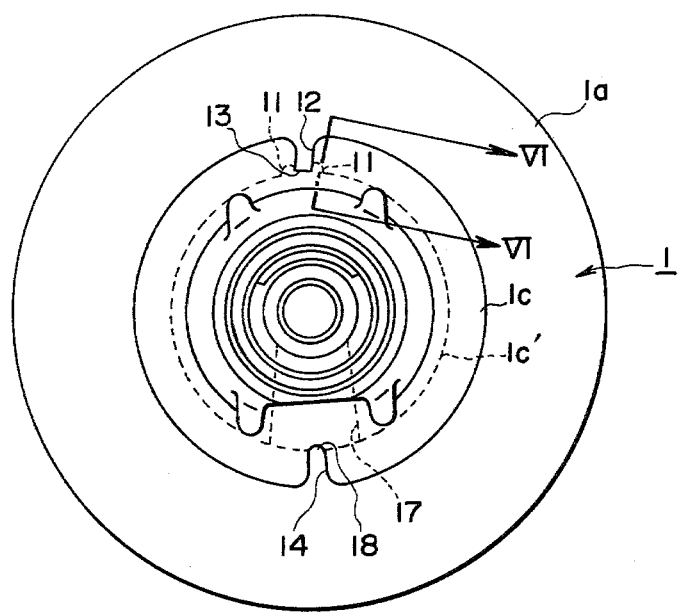
FIG. 4 shows a rear view of a power piston according to the present invention.
Figure 5:
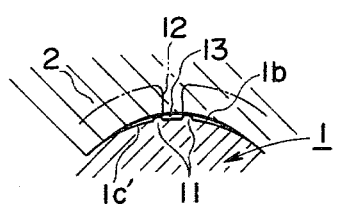
FIG. 5 shows a cross-sectional view taken along the line V—V in FIG. 3.

A first embodiment of this invention is shown in FIGS. 3 through 5 wherein like parts and components are designated by the same reference numerals and characters as those shown in FIG. 1.

According to the first embodiment, a pair of protrusion 11 are axially formed in an annular groove 1b of power piston 1, and a split groove 12 is radially formed in a flange portion 1c. The width of the split groove 12 corresponds to the distance between the protrusions, and is in alignment therewith (FIG. 4). Therefore, in fitting the inner-peripheral end of the diaphragm with the annular groove 1c, an air passage 13 is provided by the split groove 12, the bottom of the annular groove 1c, the protrusions 11 and the inner peripheral end of the diaphragm 2.

On the other hand, a second spacer 14 is formed in the diametrically opposite side of the flange 1c. The second spacer 14 communicates with a key groove 17 which receives a key 16 for preventing a valve plunger 15 from being removed from the predetermined position. Therefore an air passage 18 is provided without forming above-mentioned protrusions.

Figure 10:
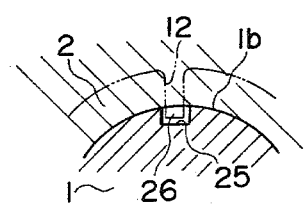

This configuration allows a groove 25 to be formed instead of the protrusions 11, as shown in FIG. 10. That is, the axial groove 25 is formed in the bottom of the annular groove 1b to provide an air passage 26 by the groove 25, the split groove 12, and the inner peripheral end of the diaphragm 2.

Figure 6:
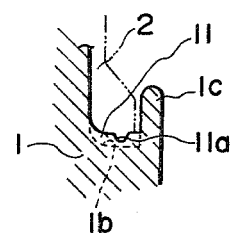
FIG. 6 shows a cross-sectional view taken along the line VI—VI in FIG. 4.

The numbers of these air passages 13, 18 or 26 can be increased if desired about the circumference of the annular groove 1c. Alternatively, a circumferencial groove 11a can be formed in the axial protrusions 11 as shown in FIG. 6.

Figure 2:
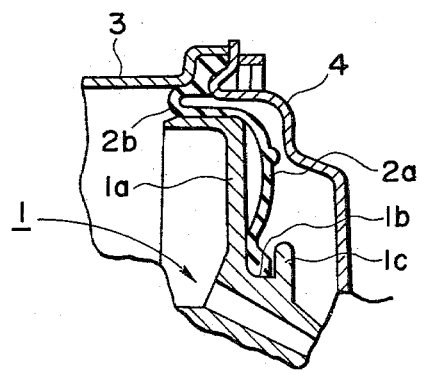
FIG. 2 shows a partial cross-sectional view showing return stroke of the power piston during non-servo period of the power servo booster shown in FIG. 1.

With this structure, during the return stroke of the power piston 1 while in non-servo operation, air accidentally confined in the space defined between the disc portion 1a and the radially outward extending section 2a of the diaphragm 2 shown in FIG. 2 can immediately escape or be discharged into the atmospheric chamber 5 through the air passage 13, 18 or 26. The return speed of the power piston 1 can be maintained high.

According to experiments conducted, it has been determined that it takes approximately 1.7 seconds to return the power piston if no air passage is formed. In contrast, it takes about 0.4 seconds to return the piston to its original position in case of forming the air passage in accordance with this invention. Therefore, according to the present invention, the air discharging work period can be reduced. Further, even if the servo operation is damaged, namely no pressure differential is provided between the atmospheric and negative chambers, the driver can repeatedly and smoothly press the brake pedal, which enhances safety.

Figure 7A:
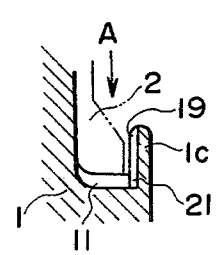
FIG. 7(a) shows a partial cross-sectional view showing the power piston according to the second embodiment of the present invention.
Figure 7B:
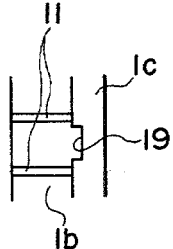
FIG. 7(b) shows a plan view as viewed from an arrow A in FIG. 7(a)
Figure 8:
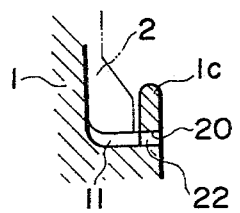
FIGS. 8, 9 and 10 show cross-sectional views showing third, fourth and fifth embodiments of this invention, respectively.

FIGS. 7 and 8 show other embodiments of the present invention. In FIG. 7, instead of the split groove, a radial groove 19 having a bottom wall is formed in the flange portion 1c of the power piston 1 to provide an air passage 21. In FIG. 8, a hole 20 is formed in the flange 1c. Of cause, the hole 20 is in alignment with the space defined between the pair of axial protrusions 11 to provide an air passage 22.

Figure 9:
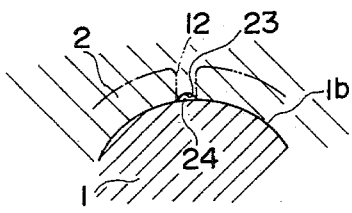

FIG. 9 shows still another embodiment of this invention, wherein a groove 23 is formed in the inner peripheral surface of the diaphragm 2. The groove 23 is in alignment with the split groove 12, or the hole 20 formed in the flange 1c of the power piston 1. This forms an air passage 24 through the diaphragm and the flange.

During normal servo operation, in which a pressure differential is established between the atmospheric and negative chambers 5 and 6, these air passages do not degrade servo operation, since the radially extending portion 2a of the diaphragm 2 is in close contact with the disc portion 19 of the piston 1 due to the pressure differential. However, when an air pocket is formed, the air passages form the necessary bleed ducts to remove any accumulated air.

We claim:

1. A power servo operable by differential pressure comprising: a housing, a unitary piston disposed in said housing, a control member coupled to said piston, said unitary piston including a disc element and a flange portion with an annular groove formed between said disc and said flange, a diaphragm member secured at its outer periphery to said housing to divide said housing into two compartments one compartment a negative pressure chamber and the other an atmospheric pressure chamber, said diaphragm member having a generally cylindrical section and an inner peripheral portion secured in said annular groove, means disposed in said negative pressure chamber for biasing said unitary piston toward said atmospheric pressure chamber and means associated with said annular groove for defining a path of fluid communication from the atmospheric pressure chamber to a space formed between said diaphragm and said disc.

2. The system of claims 1 wherein said means defining a path of fluid communication comprises a spacer formed on said disc opposite said flange portion, and a key groove disposed in said piston inwardly from said annular groove, wherein an air passage is formed between said spacer and said key way under the inner peripheral portion of said diaphragm.

3. The system of claim 1 wherein said means defining a path of fluid communication comprises a radial groove formed in said flange portion, and a pair of protrusions formed in said annular groove, the protrusions being aligned with said radial groove and the distance between said protrusions being larger than the width of said radial grooves.

4. The system of claim 1 wherein said means defining a path of fluid communication comprises a hole formed in said flange portion and a pair of protrusions formed in said annular groove, the protrusions aligned with said hole and defining an air passage under the inner peripheral portion of said diaphragm and through said hole.

5. The system of claim 1 wherein said means defining a path of fluid communication comprises a groove formed in the inner peripheral surface of said diaphragm and a split portion formed in said flange portion in alignment with said groove in said diaphragm.

6. The system of claim 1 wherein said means defining a path of fluid communication comprises a groove formed in the inner peripheral portion of said diaphragm and a hole in said flange portion in alignment with said groove in said diaphragm.

7. A power servo operable by differential pressure comprising: a housing, a piston disposed in said housing, a control member coupled to said piston, said piston including a disc element and a flange portion with an annular groove formed between said disc and said flange, a diaphragm member secured at its outer periphery to said housing to divide said housing into two compartments one compartment a negative pressure chamber and the other an atmospheric pressure chamber, said diaphragm member having a generally cylindrical section and an inner peripheral portion secured in said annular groove, means disposed in said negative pressure chamber for biasing said piston toward said atmospheric pressure chamber and, means associated with said annular groove for defining a path of fluid communication from the atmospheric pressure chamber to a space formed between said diaphragm and said disc comprising a pair of protrusions formed in said annular groove and a split groove formed in said flange portion, the width of said split groove corresponding substantially to the distance between said protrusions, whereby an air passage is formed between said protrusions and under the inner peripheral portion of said diaphragm.

8. The system of claim 7 further comprising a circumferential groove formed in said protrusions.

9. The system of claim 1 or 7 wherein said means for biasing comprises a spring disposed in said negative pressure compartment, one end of said spring abutting said housing and the other end abutting said piston.

* * * * *